July 10, 1956  H. W. GILFILLAN  2,753,727
POWER TRANSMISSION
Original Filed Jan. 19, 1946  4 Sheets-Sheet 1
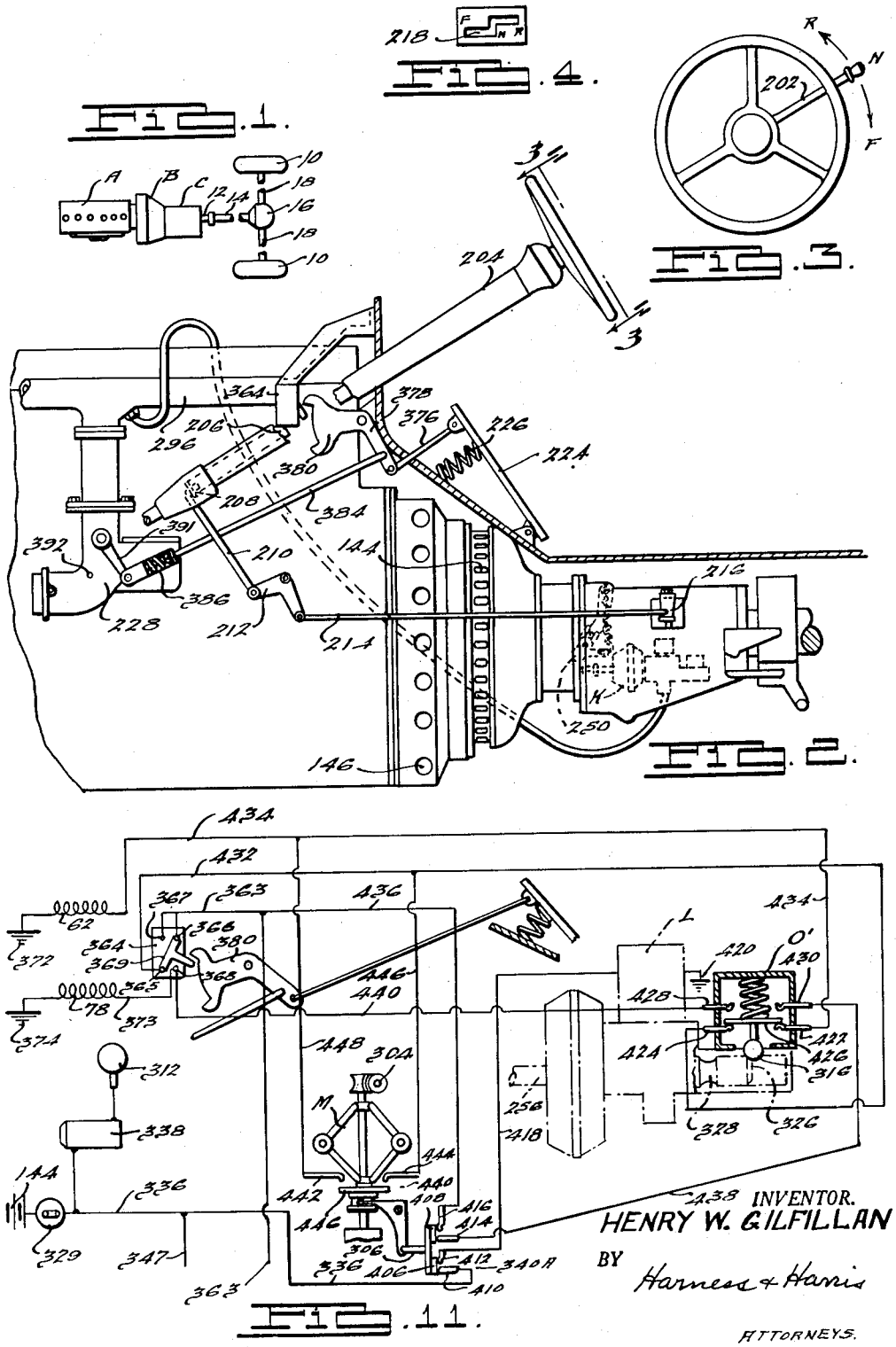
INVENTOR.
HENRY W. GILFILLAN
BY Harness & Harris
ATTORNEYS.

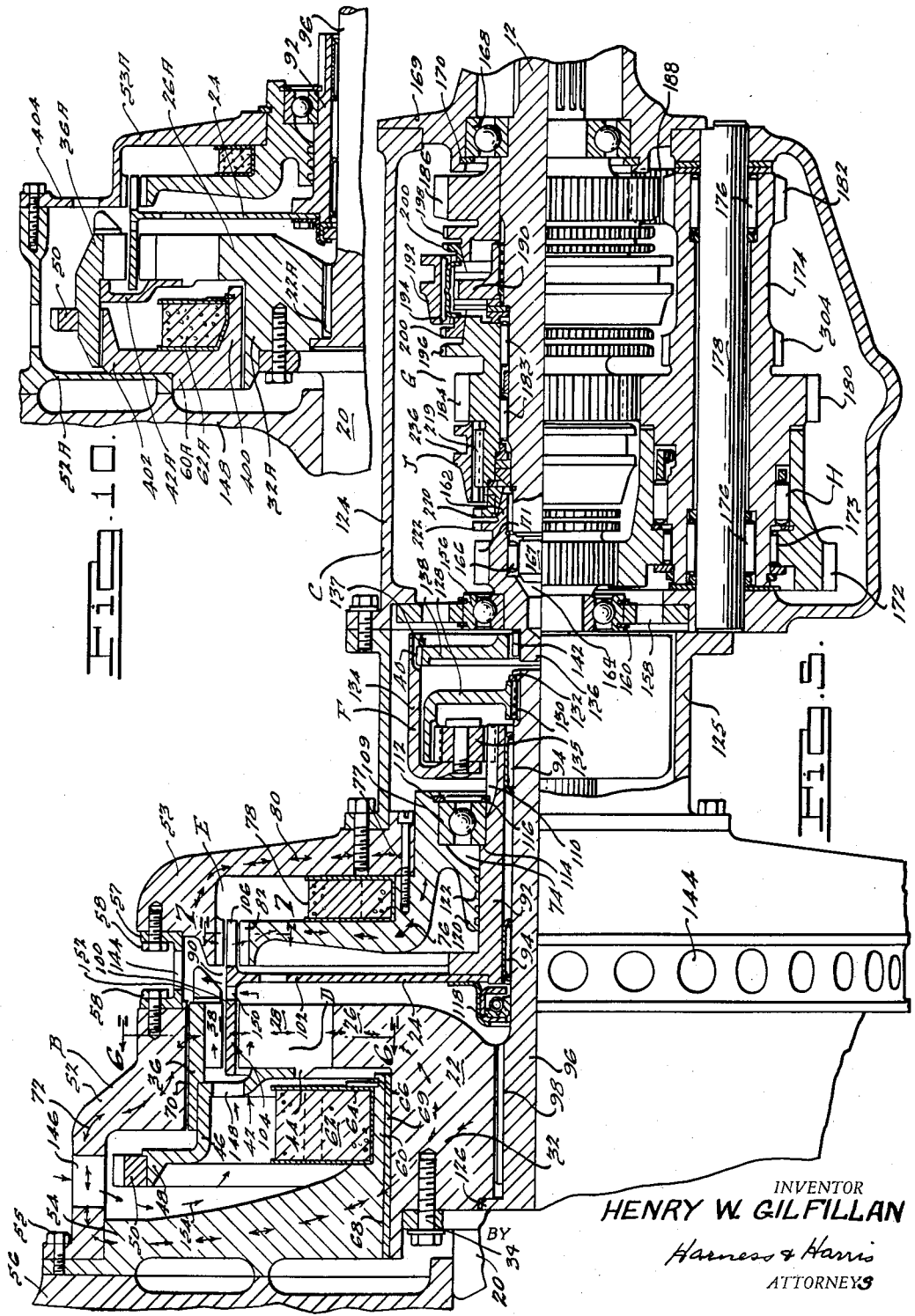

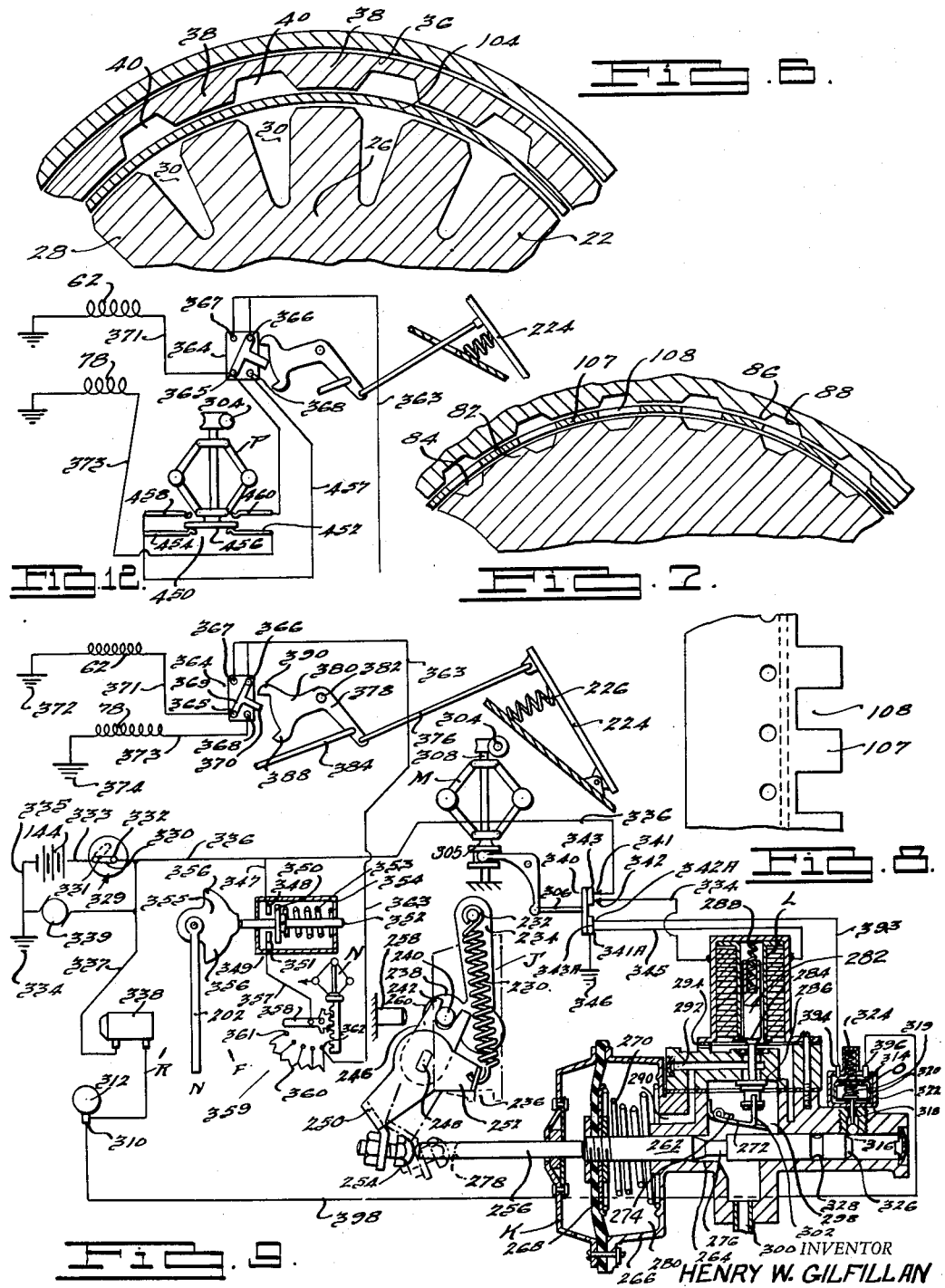

United States Patent Office 2,753,727
Patented July 10, 1956

2,753,727

POWER TRANSMISSION

Henry W. Gilfillan, Santa Ana, Calif., assignor to Chrysler Corporation, Highland Park, Mich., a corporation of Delaware Original application January 19, 1946, Serial No. 642,179, now Patent No. 2,565,494, dated August 28, 1951. Divided and this application August 23, 1951, Serial No. 243,276

5 Claims. (Cl. 74—336.5)

This invention relates to electromagnetic power transmissions and is particularly concerned with automotive transmissions having eddy current clutch and brake mechanism. The subject application is a division of my copending application Serial No. 642,179, filed January 19, 1946, now Patent No. 2,565,494 granted August 28, 1951.

In my prior Letters Patent 2,343,291 granted March 7, 1944, to me jointly with E. L. Bailey, there is disclosed a transmission employing an eddy current brake and clutch controlled planetary gearing ahead of a manually operated change speed unit. In this arrangement the torque multiplication for starting and acceleration of the vehicle is obtained by actuation of the eddy current brake mechanism, while for cruising drive of the vehicle the eddy current clutch is operated. However, the arrangement provides the same drive ratios for breakaway and acceleration thus necessitating a compromise in drive ratios between the ideal ratios for these driving conditions individually. Moreover, the magnetic circuits disclosed in that patent necessitate in the sun gear rotor a radially projecting tooth structure, non-magnetic spacers between the clutch and brake portions of said rotor and a large overhanging portion, these features all contributing to magnetic and dynamic unbalance in operation. In addition the patented mechanism includes a heavy magnetic field structure and requires specially shaped field coils.

It is the general object of this invention to provide improvements in arrangement, construction and operation over the mechanism disclosed in my prior patent.

Thus, an object of my invention is to provide an eddy current type transmission having distinct and ideally suited drive ratios for breakaway, accelerating, and cruising drives.

Another object is to provide an automotive eddy current transmission having the foregoing features and requiring no clutch pedal control for obtaining changes from one drive ratio to another.

A further object is to provide an automotive power transmission having an eddy current clutch and brake structure in advance of a suitable change speed gearing, for instance, a planetary, unitary and a multi-forward speed and reverse countershaft unit in tandem, the eddy current structure and gearing being automatically controllable whereby movement of the vehicle from rest is initiated with the eddy current clutch in actuation control for instance, of the planetary gear set, and with the countershaft type unit in underdrive and whereby cruising speed ratio is obtained under driver control at predetermined vehicle speed by an upshift in drive ratio in the countershaft unit; and whereby accelerating ratio or kickdown is automatically available at the will of the driver in any forward speed by operation of the eddy current brake.

An additional object is to provide an eddy current transmission wherein the clutch structure has a low slip value under cruising drive conditions, for example, even as low as 200 R. P. M.

It is also an object to provide the driving member of the eddy current clutch with concentric sets of opposite teeth, the flanks of the teeth of each set converging toward the teeth of the opposite set.

A further object is to provide an eddy current structure having a sun gear rotor of T-section and which may also have the portion of said rotor in the magnetic circuit of the eddy current clutch devoid of non-magnetic spacers and radially projecting tooth structure.

Another object is to provide an eddy current transmission wherein the enclosing housing of the eddy current mechanism is made to form part of the magnetic circuits of one or both of the eddy current clutch and eddy current brake structures to thereby reduce magnetic flux leakage and effecting a reduction in the mass of the overall mechanism.

Still another object is to provide in an eddy current transmission a sun gear rotor having an annular iron portion in the magnetic circuit of the eddy current mechanism substantially free of magnetic unbalance and facilitating the use of minimum air gaps between such rotor portions in the magnetic circuit and the field coils of the eddy current mechanism.

A specific object is to provide an eddy current transmission having a novel cooling system for the magnetic structure whereby provision is made for air cooling immediately adjacent the magnetic portion of the sun gear rotor.

It is also an object to provide an eddy current transmission in which the eddy current clutch and brake mechanism is separately housed from the transmission gearing and wherein the component parts of the transmission gearing and eddy current mechanism may be readily disassembled.

Another specific object is to provide a constant mesh synchronized reverse drive and low speed drive employing oversize synchro blocker clutches to speed up the sun gear rotor when making manual shifts into reverse drive and low gear.

Other objects and advantages of my invention will become more apparent from the following description taken in connection with the accompanying drawings wherein:

Figure 1 is a diagrammatic showing of the power plant and drive mechanism of a vehicle incorporating the present invention;

Figure 2 is a side elevational view of the power plant and transmission;

Figure 3 is a view taken in the direction of the arrows 3—3 of Figure 2 showing the manual drive selector;

Figure 4 is a front elevation of a detail of the manual selector housing showing the different selector positions;

Figure 5 is a longitudinal sectional elevation of the transmission of my invention;

Figure 6 is a sectional detail of the eddy current clutch structure taken at 6—6 of Figure 5;

Figure 7 is a sectional detail of the eddy current brake structure taken at 7—7 of Figure 5;

Figure 8 is a development of a portion of the driven member of the eddy current clutch;

Figure 9 is a diagrammatic view of the control mechanism and electrical system of the transmission;

Figure 10 is a longitudinal sectional elevation of a modified form of eddy current mechanism;

Figure 11 is a diagrammatic view of a modification of the control system disclosed in Figure 9;

Figure 12 is a further control modification which may be employed in the control system of Figures 9 and 11.

Figure 13:
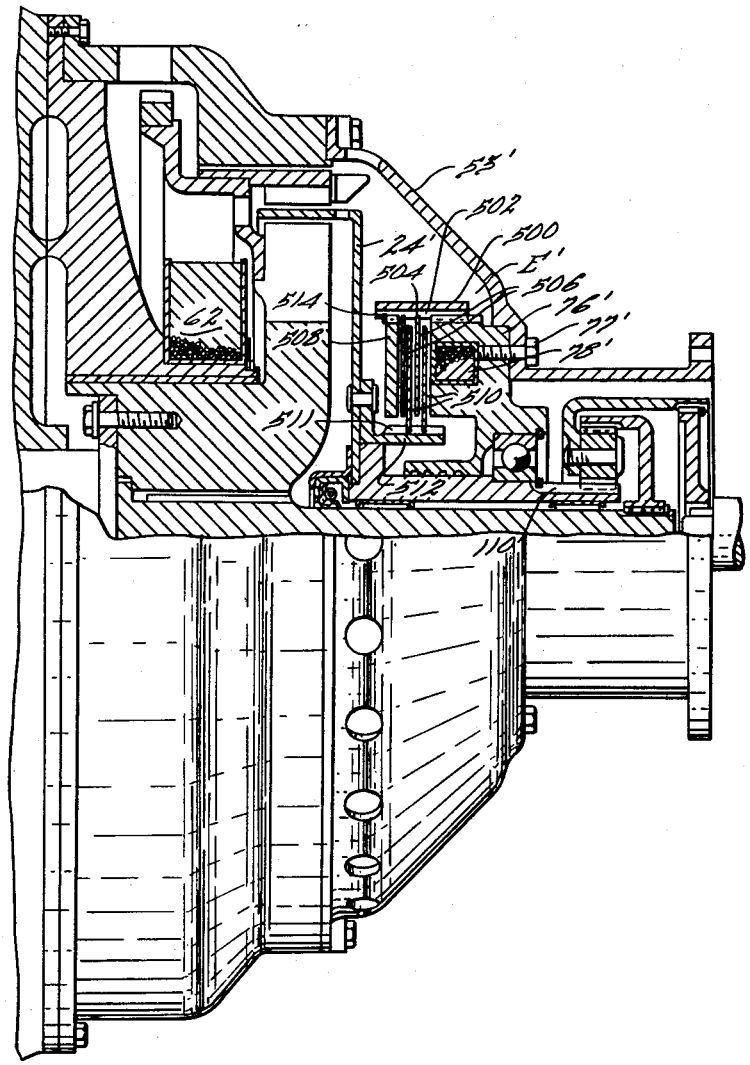
Figure 13 is a modification of the arrangement in Figure 5 illustrating applicant's invention employing a multiple disc magnetic device in place of the eddy current brake for controlling the sun gear of the planetary unit.

Referring now to the drawings wherein similar reference characters are used to designate corresponding parts of the structure, Figure 1 illustrates a typical arrangement of transmission mechanism in a vehicle embodying the present invention. The vehicle engine A is coupled to the driving wheels 10 of the vehicle through an eddy current power transmitting mechanism B and change speed gearing C, the mechanism B comprising an electrically controlled eddy current clutch and brake structure shown in detail in Figures 5, 6, 7 and a change speed gearing C comprising, as seen in Figures 5 and 9, a planetary underdrive the output of which drives a manually controlled two-speed forward and reverse countershaft gearing having automatically controlled direct drive ratio. As seen in Figure 1, the output shaft 12 of the unit C is connected by means of the usual propeller shaft 14 with customary differential gear box 16 which in turn drives the axle shafts 18. A 1:3 axle ratio is preferred.

As best seen in Figure 5, the numeral 20 designates the rear end of the crankshaft of engine A which drives the eddy current clutch mechanism generally designated by the letter D and which includes a drive member 22 and a driven member 24. The drive member 22, which also serves as the engine flywheel comprises an annular element 26 of magnetic iron or other magnetic material, the periphery of which is formed as best seen in Figure 6, with a circumferential set of alternate radially projecting teeth 28 and spaces 30 uniformly spaced circumferentially of this member. The drive member 22 also has a forwardly extending hub 32 (Figure 5) secured by bolts 34 to the crankshaft and portion 20 of the engine A. The teeth 28 of the drive member constitute definite polar projections of the same polarity.

The drive member 22 further includes a second annular element 36 also of magnetic iron or other suitable magnetic material positioned concentric to the element 26 and also possessing a circumferential set of uniformly spaced internal radially projecting teeth 38 which teeth are separated as seen in Figure 6 by the spaces 40. As also seen in Figures 5 and 6, the two sets of teeth are separated by an annular space for receiving a portion of the driven member 24 hereinafter referred to. Moreover, the number of teeth in each set is the same and the teeth are preferably radially aligned both circumferentially and longitudinally of the axis of rotation of the drive member. As in the case of the teeth 28, the teeth 38 also constitute polar projections of the same polarity, but are of opposite polarity to the teeth 28. The elements 26 and 36 carrying the teeth 28 and 38 respectively, are retained in the aforesaid relationship by an annular spider 42 of non-magnetic material, for instance, stainless steel or brass carried by side projections 44 of the teeth 28 and secured to these teeth by suitable fastening means, not shown. The spider 42 includes a forwardly projecting shelf portion 46 non-rotatably supporting the element 36 of the drive member thus maintaining the teeth 28 and 38 in the predetermined radially spaced relationship referred to above and further including a shouldered flange portion 48 non-rotatably carrying the familiar ring gear 50 forming part of the engine starting mechanism.

Surrounding the drive and driven members of the eddy current clutch is a housing formed of three annular stationary casing elements or portions 52, 53, and 54 of magnetic iron or other magnetic material forming part of the field structures of the eddy current mechanism. As seen in Figure 5, the elements 52 and 54 are secured as by bolts 55 to the engine block 56 and the elements 52 and 53 are connected by an annular channel-like member 57 of non-magnetic material fitted over annular shoulders of the housing elements respectively, and secured to the housing elements as by bolts 58.

The casing element 54 has a rearwardly projecting hub portion 60 for supporting a stationary field coil assembly 62 which is retained in position by a washer 64 and snap ring 66. The housing element 54 also includes a central bore 68 in which is press-fitted a bearing sleeve 69 of nickel iron composition, which provides a loose running fit with the hub 32 of the eddy current drive member 22. The casing element 52 has an inner cylindrical surface 70 concentric with the toothed ring 36 of the eddy current drive structure and separated therefrom radially by an air gap in the order of five to ten thousandths of an inch to provide operating clearance. As seen by the double-ended arrows 72 designating the magnetic circuit of the eddy current clutch the casing elements 52 and 54 form part of the magnetic circuit of the eddy current clutch D.

Rearwardly of the casing element 53 is a bore 74 in which is fitted an annular core or pole piece member 76 stationarily secured by bolts 77 to the casing element 53. The member 76 carries an annular field coil assembly 78. As indicated by the double-ended arrows 80 the casing element 53 and the member 76 provide the magnetic circuit for the eddy current brake structure E. Moreover, as best seen in Figure 7 the periphery of the core member 76 is provided with a circumferential set of alternate radially projecting external teeth 82 and spaces 84 uniformly spaced circumferentially of this member, and the casing element 53 has a set of opposite internal radially projecting teeth 86 concentrically arranged with and spaced radially of the teeth 82 and in radial alignment therewith, the teeth 86 being uniformly spaced circumferentially of the casing 53 and separated by spaces 88. All the teeth 82 constitute polar projections of one polarity and all the teeth 86 polar projections of similar polarity to each other but of opposite polarity to that of the teeth 82.

The driven member 24 of the eddy current clutch D and which is also the operating member of the eddy current brake E comprises an annular thin walled drum 90 of T-section rotatably mounted by its hub 92 on spaced needle bearings 94 on a shaft 96 preferably of non-magnetic material, the latter being splined as at 98 to the drive member 22 of the eddy current clutch. The drum 90 includes a relatively thin cylindrical shell 100 of magnetic iron or other suitable magnetic mateial connected by a central web 102 to the hub 92, the web and hub being preferably of non-magnetic material to reduce flux leakage.

The forwardly extending portion 104 of the shell 100 of the drum 90 is solid throughout its cylindric section and arranged to rotate with slight clearance, five to ten thousandths of an inch between the sets of teeth 28 and 38 and concentric thereto, this portion of the driven member 24 of the eddy current mechanism being rotatable relative to the polar projections 28 and 38 of the drive member 22 and being cooperable therewith to perform the functions of the eddy current clutch. The rearwardly extending portion 106 of the shell 100 of the drum 90 is similarly arranged between the sets of teeth 82 and 86 of the stationary eddy current brake field structure but instead of being solid throughout, its cylindrical section is cut through at alternate places to provide a serrated edge of uniformly spaced alternate teeth 107 and spaces 108 (see Figure 8) extending axially of the drum and substantially the axial length of the teeth 82 and 86. The teeth 107 are of equal number to the teeth 82 and 86 and coextensive circumferentially therewith so that the teeth 82, 86, and 107 are adapted to be radially aligned in operation for reasons hereinafter stated. Preferably the teeth 107 will be of rectangular form and complementary in shape to spaces 108.

The T-section of the drum 90 has the advantage of reducing overhang of the portions 104 and 106 thereof thus reducing distortion in operating the eddy current brake and clutch and likewise facilitates the use of smaller air gaps between the drum and its respective field structures. Moreover, the freedom from radially projecting teeth enables a reduction in the mass of the drum to a minimum to thereby minimize its inertia.

The hub 92 of the driven eddy current member 24 extends rearwardly through a supporting ball bearing 109 carried in the brake pole piece 76 and is provided with gear teeth or splines 110 constituting the sun gear of a planetary gearing F. The ball bearing 109 is retained in the member 76 by a snap ring 112 and serves to locate the member 24 through the shoulder 114 of the hub 92 and a snap ring 116 thereon. The eddy current drive member shaft 96 has an oil seal 118 between it and the member 24 and a further oil seal is provided by a forward projecting hub 120 of the brake pole piece 76 which is provided with oil grooves 122 adjacent the hub 92. These oil retainer structures facilitate confinement of oil of the transmission gearing in the housing 124, 125 enclosing such mechanism. It will be observed that the shaft 96 has an end flange 126 located between the crankshaft portion 20 and eddy current drive element 22 to locate this shaft axially.

The shaft 96 is drivingly connected to the annulus 128 of the planetary unit F through a splined connection 130, the annulus being retained on the shaft by a snap ring 132. The spider 134 of the planetary gear set carries the planet pinions 135 and is the output member of the planetary gear set and further drivingly connects the input shaft 136 of the countershaft unit G through an element 138 having a splined connection at 140 with the spider 134 and a splined connection at 142 with the shaft 136. A snap ring 137 retains the element 138 in axial position on the spider.

In operation of the mechanism so far described, rotation of the engine crankshaft 20 in the usual clockwise direction looking rearwardly of the transmission will cause corresponding rotation of the eddy current clutch drive member 22. If the field coils 62 and 78 of the eddy current mechanism are open-circuited, that is, de-energized, the reaction of the shaft 136 (which is assumed to be drivingly connected to the vehicle drive wheels) on the planetary spider 134 will cause the annulus to drive the sun gear in reverse direction at approximately 2½ times the crankshaft speed, no torque being then transmitted to the countershaft input shaft 136.

If now the field coil 62 of the eddy current clutch mechanism be energized, magnetic flux will flow in the path represented by the arrow 72 in Figure 5 through the iron portions 54, 52, 36, 32, and the portion 69 and across the air gaps between the adjacent relatively movable members or elements of the eddy current clutch structure. The direction of flow of the magnetic lines of force will depend upon the direction of current flow in the field winding 62, but whether the same be in one direction or the other the result upon the eddy current clutch mechanism will be the same and hence the arrows 72 in Figure 5 have been shown double-ended. Upon creation of the magnetic field it will be noted from Figure 6 that points of high flux density will exist where the flux path through the portion 104 of the drum 90 of the driven member is between the polar projections or teeth 28 and 38 and that points of low density will occur where the flux path through the portion 104 is across the opposite bases of the spaces 30 and 40 between the teeth 28 and 38 respectively. Hence, as each point on the portion 104 of the drum 90 passes through points of high and low flux density and so long as relative rotation exists between the teeth 28, 38 of the member 22 and the portion 104 of the drum 90, and there is flow of magnetic flux generated by the field coil 62, eddy currents will be induced in the portion 104 of the driven member, that is the member opposite the teeth, having a direction of flow perpendicular to the flow of the main flux and in accordance with Lenz's law creating a magnetic flux opposing the main flux and tending to oppose relative rotation between the drive and driven members of the eddy current clutch structure thus inducing a driving torque in the output member 24 which is a maximum when the eddy currents are maximum, that is, at maximum slip of the member 24. As the engine speed approaches that of the shaft 136 through balance of power input and load, the member 24 will tend to approach the speed of the driving member 22 and to rotate at synchronism therewith and when this occurs a matter of seconds after energization of the field coil 62, the planetary gear set F will be substantially locked up as a unit and drive will then be transferred from the engine to the shaft 136 at a 1:1 ratio. It is to be noted in this connection that the engine drives the annulus 128 at 1:1 and the member 22 and the sun gear 110 receive their drive from the member 24. In actual practice there always will be present some slip depending upon torque such being minimized at cruising speeds of the vehicle. Hence the actual drive ratio will be somewhat under 1:1 on starting drive through the eddy current clutch and will be substantially 1:1 at cruising speeds of the vehicle. It is also to be noted that because of the toothless construction of the portion 104 of the drum 90 the magnetic flux across the teeth 28, 38 at each point in the portion 104 is substantially the same. This makes it possible to minimize magnetic reluctance between teeth 28 and 38 and provides a smoother control of the clutch mechanism.

If the field coil 62 of the eddy current clutch be de-energized and the field coil 78 of the eddy current brake mechanism energized, magnetic flux will flow in an endless path denominated by the arrows 80 in Figure 5 through the casing 53, core member 76 and portion 106 of the driven member 24 crossing the air gaps between the portion 106 and the casing and core members respectively. As illustrated in Figures 7 and 8 the portion 106 of the drum 90 has axially projecting teeth formed thereon. These teeth define polar projections that are spaced circumferentially of the drum 90 from one another in such manner that they may align radially with the teeth 82 and 86 of the field members 53 and 76 and with the spaces 84 and 88 between these teeth in alternate fashion during rotation of the driven member 24. When the teeth 82, 107, and 86 are all in radial alignment, the flux flowing in the field elements 53 and 76 and teeth 82 and 86 will flow through the teeth 107 and thus will encounter relatively low resistance to flow, the reluctance of the air gap between positively disposed teeth 82 and 86 having been reduced by the iron in the teeth 107. Correspondingly, when the teeth 107 are radially aligned with the spaces between the teeth 82 and the spaces between the teeth 86, the flux will encounter relatively great resistance to flow because of the reluctance of the large air gap then between the teeth 82 and 86. Thus, the flux is at a maximum when the teeth 82, 107 and 86 are aligned and at a minimum when teeth 107 are out of alignment with teeth 82 and 86.

Accordingly, during rotation of the member 24 the flux will fluctuate between maximum and minimum values, the frequency thereof being determined by the speed of rotation of the member 24 and in consequence of this relative rotation eddy currents will be induced in teeth 107 and in the teeth 82 and 86 flowing in a direction perpendicular to the flow of the main flux and in accordance with Lenz' law induce a magnetic flux of their own which will react with the main flux and oppose relative motion between the rotor 24 and field members 76 and 53. Inasmuch as the member 24 will at this time be rotated counterclockwise, that is, opposite to the crankshaft 20, the effect of the eddy current flux will be to slow down the reverse rotation of the member 24 and bring the same to a stop whereupon the direct magnetic pull across the polar projections 82, 107, and 86 will thereafter hold this member stationary and the planetary gearset F will through reaction on the sun gear 116 of member 24 transmit a torque multiplying drive to the countershaft unit shaft 136 which will be accelerated in underdrive ratio at a speed dependent upon engine speed. It will be appreciated that torque will be imposed on shaft 136 from the instant that member 24 begins to slow down and therefore, the torque application will be smooth and gradual, the eddy current brake serving as a smooth acting clutch. Acceleration of the vehicle with the planetary in underdrive may be continued as long as desired and when changeover to the eddy current clutch is to be effected, the coil 78 will be deenergized and coil 62 energized whereupon the eddy current brake E will be released and eddy current clutch D will magnetically couple the member 24 to the driving member 22 for forward rotation therewith.

It is to be observed that the teeth 28 of the eddy current clutch member 22 have substantially parallel sides for a considerable portion of their length. The purpose of this is to eliminate the use of excess iron for carrying the necessary magnetic flux. The member is designed to start the tooth structure from a base circle providing sufficient iron area and to maintain this area constant by paralleling the sides of the teeth to a point adjacent he tips of he teeth at which place the sides of the teeth are tapered convergingly to produce saturation of the iron at this point. It will be observed that the teeth 38, 82, and 86 are likewise tapered for the same reasons.

During operation of the eddy current brake E there is a considerable amount of heat generated and to provide a means of air circulation, the annular casing member 57 and the casing element 52 are provided with openings 144 and 146 respectively; the spider 42 of drive member 22 with openings 148 and driven member 24 with openings 150. All these openings are arranged circumferentially in suitable number around their respective members. In addition the element 36 of the drive member 22 is provided with vanes 152 spaced at the circumference of that element. The teeth 28 and 38 and vanes 152 will serve as air impellers, and since the member 22 always rotates at engine speed, continuous circulation of air will be provided so long as the engine is operating, the air entering at 146 and moving in the direction of the arrows 154 and out the openings 144. It will be understood that suitable screens may be provided for the openings 144 and 146.

Referring now to the countershaft change speed gearset G, it will be seen from Figure 5 that the shaft 136 extends rearwardly through the ball bearing 156 retained in a bracket 158 by snap rings 160. The bracket 158 is secured to the housing 124 by suitable means not shown. Shaft 136 terminates in a cone-shaped clutch portion 162 and a hollow portion 164 thereof provides space for a roller bearing 166 which pilots the forward end 167 of the tail shaft 12, the opposite end of the tail shaft being supported by and extending through a ball bearing 168 retained in a removable housing 169 by retainer 170.

Integral with the shaft 136 is a pinion 171 which is in constant mesh with a gear 172. The latter is rotatable on roller bearing 173 and drives a countershaft 174 through an overrunning clutch H of conventional type such that when the shaft 136 drives in the usual clockwise direction (looking from front to rear) then clutch H will engage to lock the gear 172 to countershaft 174 whenever the gear 172 tends to drive faster than the countershaft, but whenever the gear 172 tends to rotate slower than the countershaft 174 then clutch H will release whereby the shaft 136 under certain conditions may readily drop its speed while the countershaft 174 continues to revolve.

Countershaft 174 is rotatably supported on roller bearings 176 carried by a rod 178 held in the housing 124, and comprises cluster gears 180, 182 which respectively provide drive in underdrive and reverse in the countershaft gearing. Freely rotatable on the shaft 12 through roller bearings 183 is the underdrive gear 184 which is in constant mesh with countershaft gear 180. Reverse gear 186 is also free on shaft 12 and constantly meshes with idler gear 188 which in turn is in constant mesh with the countershaft reverse gear 182. Hence, all gearing forward and reverse is in constant mesh and there is no shifting of gears required in the change speed gearing of my transmission. A hub 190 is splined on shaft 12 and carries therewith a manually shiftable sleeve 192 having clutch teeth 194 which sleeve is adapted to shift from the Figure 5 neutral position either forwardly to clutch with clutch teeth 196 of gear 184 or else rearwardly to clutch with clutch teeth 198 of gear 186. It will be observed that suitable blocker synchromesh mechanism 200 is provided to facilitate smooth and noiseless engagement of the sleeve 192 with the teeth 196 or 198. Inasmuch as any suitable type of blocker synchromesh mechanism may be used, this part of the mechanism is not described in detail, it being deemed sufficient to briefly refer to salient parts thereof.

It will be noted that the synchro blocker clutches for forward and reverse drive of the constant mesh gearing are each oversized, that is much larger than conventionally used. This is desirable to facilitate smooth engagement of the clutches while overcoming the substantial inertia effect of the sun gear carrying or driven member 24 which rotates backward under urging of the engine and at about 2½ times engine idle speed when the coils 62 and 78 are both deenergized.

Sleeve 192 is operably connected to a shift rail of conventional form, not shown, which is operable through the selector lever 202 seen in Figures 3 and 9 forming part of the steering column mechanism 204. The lever 202 connects as by a suitable spline with a tubular shaft 206 shown in phantom in Figure 2, having at its lower end a lever 208 connected through link 210, bell crank 212, and link 214 with a lever 216 which in turn operates a lever not shown, within the transmission housing connected to the shift rail that operates the sleeve 192. As seen in Figure 4, the shift lever 202 operates in a zigzag slot 218 of the steering column housing and is so shaped to prevent movement of the selector lever directly from forward drive position to reverse drive position or vice versa in the same planar motion while the vehicle is operating in one of these drive conditions. In this connection the splined coupling of the selector lever with the shaft 206 is arranged to permit sufficient rocking movement of the lever to accommodate operation of the selector lever from one horizontal portion of the zigzag slot to the other.

Slidably splined as at 219 is the automatic clutching sleeve J which, under certain conditions, is adapted to shift forwardly through blocker synchromesh mechanism 220 to clutch with teeth 222 carried by the pinion 171 thereby positively clutching gear 184 directly with the shaft 136. This sleeve J is adapted to step up the speed ratio in the countershaft gearing from free-wheeling indirect drive to two-way direct drive when the manual selector sleeve 192 is in forward drive position, and to step up the speed ratio in reverse drive by driving the countershaft cluster through the gear 184—180, thus providing a two-way reverse drive through the countershaft gearing including the sleeves 192 and J the free wheel clutch H overrunning. The blocker mechanism is adapted to limit engagement of the sleeve J with the clutch teeth 222. Thus when the relative speeds of these elements are asynchronous the teeth of the blocker mechanism in this control operation will lie in the path of the forward shift of sleeve J and when their relative speeds are approximately synchronous the teeth of the blocker will permit the teeth of the sleeve J to pass between them to allow clutching to take place.

For instance, when driving in indirect forward drive in the countershaft gearing above a predetermined vehicle speed, direct drive therein is obtained by the driver letting up on the usual accelerator pedal 224 thereby allowing spring 226 to perform a closing movement on the engine throttle valve 228 and cause the engine to rapidly coast down. When this occurs the engine along with the shaft 136, pinion 171, gear 172 all slow down, while shaft 12 along with gear 184 continues their speeds by accommodation of freewheeling unit H which now overruns. The engine slows down until teeth 222 are brought to approximate synchronism with sleeve J which thereupon automatically shifts to clutch with teeth 222 resulting in a two-way direct drive from pinion 171, through sleeve J to gear 184 thence through sleeve 192, hub 190 to shaft 12, the clutch H overrunning. When driving in indirect reverse drive a stepup may similarly be obtained but the drive then will be indirect from gear 171 through sleeve J to gear 184 and gear 180.

The transmission is also provided with suitable control means including motor means, for controlling power shift of sleeve J. Referring particularly to Figures 2 and 9, there is illustrated a pressure fluid operated motor K utilizing air pressure for its operation. For convenience, this motor is arranged to operate by the "vacuum" in the intake manifold system of the engine under control of electromagnetic means illustrated in the form of a solenoid L. The term "vacuum" is commonly used to denote pressures less than atmospheric and it is in this sense that I use this term and not in the strict sense of zero pressure or absolute vacuum.

Forward shift of the sleeve J is effected, under control of the motor K by reason of a spring 230 having its upper end hooked over a shaft 232 carried in the housing 124 of the transmission C. A shift yoke 234 is mounted to freely rock on the shaft 232 and engages the shift groove 236 of the sleeve J, the yoke having a plurality of arms, one of which is provided with a forwardly extending portion 238 carrying a lateral pin 240 which engages the yoke portion 242 of an upstanding lever 246. The lever 246 is fixed to a rockshaft 248, which also has fixed thereto a bellcrank follower lever member having lever arms 250 and 252. The end of lever 252 is connected to the lower end of spring 230 and lever 250 carries an adjustable abutment 254 for adjusting the lost motion relationship between the lever 250 and a reciprocatory rod 256 of the motor K as will presently be apparent.

Spring 230 acts to yieldingly urge engagement of the sleeve J, acting through the lever 252, shaft 248 and lever 246, to cause the pin 240 to swing the yoke 234 forwardly on its shaft 232 until, when the sleeve J is fully engaged, a stop pin 258 engages the forward portion 260 of the yoke portion 238. This limits the rearward swing of the lever 250.

Arranged for engaging the abutment 254 during its arcuate movement about the axis of the shaft 248 is a thrust-imparting leader member in the form of the reciprocatory rod 256 aforementioned having an enlarged central portion 262 slidably supported in the bore 264 of the motor K.

Motor K comprises a cylinder 266 which contains a piston 268, herein illustrated as of the diaphragm type. This piston has its outer portion secured to the cylinder 266 and its central portion fixed to the rod 256, the piston and rod being urged forwardly in a direction to release the sleeve J by a spring 270 which is much stronger than the spring 230. A suitable type of releasable holding means is provided for the rod 256 so as to releasably hold this rod and the piston 268 rearwardly retracted against the action of the spring 270 and independently of the continuance of vacuum until it is desired to urge disengagement of the sleeve J. This releasable holding means is illustrated in the form of a latch 272 which, under the action of a rat trap spring 274 catches on the rearward shoulder of a detent 276 in rod portion 262. At this time the leader rod 256 moves rearwardly further than the follower lever 250 by an amount represented by the gap 278 between the abutment 254 and left hand end of the rod 256 such that on releasing the latch 272 the rod 256 may move forwardly the amount of this gap without requiring the sleeve J to move from its engaged position toward its disengaged position.

The vacuum supplied to the working chamber 280 is under control of the aforementioned solenoid L which comprises an armature plunger 282 having valving ports 284 and 286. In Figure 9 the solenoid L is energized thereby raising the plunger 282 against the spring 288 to seat the valve 286 and shut off the vacuum supply to chamber 280 and at the same time unseat valve 284 so as to vent this chamber through the passage 290, chamber 292 and vent passage 294. When the solenoid is deenergized, then spring 288 lowers the plunger 282 thereby seating the valve 284 to shut off vent 294 and open valve 286 thereby opening the chamber 280 to the engine intake manifold 296 through passage 290, chamber 292, chamber 298 and pipe 300.

A certain lost motion is provided between plunger 282 and the inwardly bent finger 302 of latch 272 so that when the plunger moves downwardly, the latch may subsequently catch detent 276 when vacuum operates the piston 268, the parts then remaining in the shifted position independently of vacuum in the chamber 280 until the solenoid L is energized to release the latch and vent the chamber 298.

It is deemed preferable to provide a speed control for the energization of solenoid L so as to insure automatic release of the sleeve J below a predetermined car speed and to accommodate automatic engagement of the sleeve J above a predetermined car speed. Whenever the vehicle is in forward speed range driving condition the manual sleeve 192 is shifted forwardly to the forward drive position so that by driving a governor from the countershaft 174, it is possible to provide a speed control operation proportionate to the speed of travel of the car when driven by the engine. Driven from the countershaft gear 304 is a suitable governor M Figure 9, of any suitable type, this governor operating a sleeve 305 outwardly along its drive shaft 308 as the car speed increases.

It is preferred that the governor should call for a step-up in drive ratio by operation of the sleeve J at a predetermined car speed and should maintain this condition during engine retardation sufficient to synchronize the speeds of teeth 222 and sleeve J. To accommodate this action the governor is so constructed as to call for a downshift at a car speed somewhat under the speed at which step-up is called for. In order to facilitate step-down from engaged position of the sleeve J when bringing the car to a stop or when greater acceleration is desired I preferably provide means for unloading the drive torque on the teeth of the sleeve J. This relief means is arranged to function automatically in response to forward travel of rod 256 from a position corresponding to the engaged position of the sleeve J to a position corresponding to the disengaged position thereof (shown in phantom in Figure 9). Preferably the relief means is in the form of a system of grounding the primary coil terminal 310 of the usual distributor 312 of the engine ignition system whereby the engine ignition may be momentarily rendered inoperative thereby unloading the torque at sleeve J to insure its release by spring 270.

The ignition interruption is under control of an interrupter switch O which is closed to ground the ignition by a bridge piece 314 upon upward movement of the ball 316, the latter transferring its movement to the plunger 318, spring 319, cup 320 to cause the bridge piece 314 to close the switch and electrically connect the terminals of switch O. The body 322 of the switch O has an inturned seat at its lower end to prevent the ball 316 from falling out. A spring 324 urges the switch to open position.

When the rod 256 is moved to the right in Figure 9 upon admission of vacuum to motor K to condition the sleeve J for upshift, the portion 326 on rod 256 moves the ball 316 upwardly to close the switch O. The switch again opens when the recess 328 on rod 256 is aligned with the ball 316. During downshift operation by the spring 270 a similar but reverse movement of the rod 256 takes place, the switch O being operated during movement of the rod 256 in taking up the gap 278 Figure 9 and grounding the ignition in the interval of time between operation of the rod 256 between portions 328 and 326 respectively.

Referring now especially to Figure 9 for the electrical system of the transmission and various control instrumentalities including those described above and which illustrate the various instrumentalities in their positions with the vehicle at rest, and engine ignition on, the driver operated ignition switch 329 comprising the conductor 330 shown in "on" or "closed" position, electrically connects contacts 331 and 332. Contact 331 extends by conductor 333 to battery 144 and thence to ground 334 by conductor 335. Contact 332 extends by conductor 336 and branch conductor 337 to the engine ignition system herein shown in part as comprising coil 338, distributor 312 having the primary terminal 310 and generator 339 shunting the battery 144.

The conductor 336 extends to a 4-pole switch 340 operated by governor M. The switch 340 is provided with terminals 341 and 342 adapted to be bridged by a conductor element 343, the latter being carried by the link 306 of the governor. A conductor 334 extends from the terminal 342 to the solenoid L and from there by conductor 345 to terminal 341A of switch 340 and thence to ground 346 through a conductor 343A also carried by the link 306. The switch 340 has a further terminal 342A which is adapted to be connected in circuit with the terminal 341A by the conductor 343A which bridges the same when the switch 340 is in closed position as shown. In the circuit as shown the solenoid L is energized, the motor K vented and sleeve J in its neutral or disengaged position.

A second conductor 347 branches from the conductor 336 to a terminal 348 of a switch generally designated by the numeral 349 operated by the manual gear selector 202. The switch 349 has a movable conductor bar 350 which is adapted to bridge the terminal 348 and a second terminal 351 to close this switch. The conductor bar 350 is carried on a rod 352 and a spring 353 acting between the insulated switch housing 354 and the bar 350 urges the switch to closed position. The switch is actuated by a cam 355 under control of the manual selector 202. As shown, the selector is in neutral position with the switch open. Movement of the selector to forward drive position or reverse position brings the low portion 356 of cam 355 opposite the rod 352 allowing the switch 349 to close.

A conductor 357 extends from the terminal 351 to the movable switch arm 358 of a rheostat switch 359 having a variable resistance 360 automatically controlled by a governor N operably connected to the switch arm 358. One end of the resistance is connected to a terminal 361 and the other end to a terminal 362 with taps taken off at intermediate points and directed to intermediate terminals. When the switch arm 358 is in contact with the terminal 361 maximum resistance will be in the circuit and when the arm is in contact with terminal 362 there will be no resistance in the circuit.

A conductor 363 extends from the terminal 362 to a kickdown switch comprising the two position double pole snap switch 364. The switch has two sets of terminals 365, 366 and 367, 368 between which a snap action bar conductor 369 having an operating finger 370 may function. The conductor 363 connects with the terminals 366, 367, that is one terminal of each set. A conductor 371 extends from the terminal 365 to the eddy current clutch coil 62 and the latter connects with ground 372. Terminal 368 is connected by conductor 373 to the eddy current brake coil 78 and the latter connects with ground 374.

The switch 364 is shown in its normal position closing the circuit to coil 62. In connection with current flow to this coil it will be noted that the governor N is intended to be driven by the engine A, for example, by the generator drive shaft, and functions to open the circuit between conductors 357 and 363 gradually when the vehicle comes to a stop and to gradually energize the coil 62 by cutting out resistance when the vehicle is started from rest.

The switch 364 is operated to close the circuit to coil 78, by depression of the accelerator pedal 224 acting through a link 376, connected to the arm 378 of a bellcrank 380 pivoted at 382. A link 384 connects the bellcrank with the throttle valve 228 through a lost motion connection 386 (see Figure 2), which permits overtravel of the accelerator pedal. The other arm of the bellcrank has two spaced operating fingers 388 and 390 respectively for engagement with the switch operating arm 370. Upon depression of the accelerator pedal which is illustrated in its released position in Figure 9, the finger 388 takes up the space between it and the switch control arm 370 and actuates the latter to open the circuit to coil 62 and close that to 78. If desired, the spacing between fingers 388 and 390 may be sufficient that the throttle is operated to wide open position by full depression of the accelerator before the switch 364 is actuated, this being facilitated by the lost motion connection 386 (Figure 2) the throttle arm 391 being then against the stop 392. It will be observed that the lost motion permitted in operating the switch 364 is also operable in releasing movement of the accelerator so that the switch is not operated to re-energize the coil 62 until the accelerator is practically fully released. This lost motion makes it possible to operate the throttle within a considerable range without obtaining kickdown or once having obtained the latter it enables continuous operation in kickdown condition of the transmission without the necessity of maintaining full throttle opening. The spring 226 returns the accelerator upon release thereof and returns the switch 364 to normal position.

The ignition interruption circuit under control of the switch O connects with the ground 346 through governor switch 340 when the latter is closed, terminal 394 of switch O connecting with terminal 342A of switch 340 through conductor 393. The other terminal 396 is connected to the terminal 310 of the distributor by a conductor 398.

*Operation*

In describing the operation of the transmission, let it be assumed that the vehicle is at rest with the ignition switch 329 closed, the engine A idling and the gear selector lever 202 in neutral. Since the governor switch 340 is also then closed the solenoid L circuit is energized and the core 282 will be in the position shown in Figure 9 with the valve 284 open and motor K vented, thus maintaining sleeve J in disengaged position. It will be understood that during the time the ignition switch 329 is open the solenoid L is deenergized opening the valve 286. However, since the engine is dead there is no vacuum available and the motor remains in vented position under urging of the spring 270 which is the disengaged position of the sleeve J in which position the sleeve was actuated when the vehicle was last brought to rest. The aforesaid conditioning occurs immediately that the ignition switch is closed and thereby prevents the sleeve J from being conditioned for engagement while the car is at rest.

In order to start the vehicle for forward movement, the gear selector lever 202 is swung clockwise about the axis of the steering column to forward drive position thus causing operation of link 210, bellcrank 212, link 214, and lever 216 to shift the sleeve 192 forwardly of Figure 5 to thereby mesh the teeth thereof with the clutch teeth 196 of low speed gear 184. Engagement will be facilitated by the fact that the synchro clutch is oversize. At the same time the accompanying movement of cam plate 355 will permit the selector switch 349, plunger 352 to move forward under urging of spring 353 and enable conductor bar 350 to bridge the terminals 348, 351 to close this switch. Since the rheostat switch 359 is preferably open circuited at this time no current will flow to either coil 62 or 78 and engagement of the clutch sleeve 192 is assured without clash of the teeth. It is preferred, especially if the rheostat switch be omitted, that the cam plate 155 be designed such that the switch 349 will remain open until the plate 355 has been swung sufficiently to fully engage the sleeve 192 with the clutch teeth 196. A similar arrangement is desired when engaging the sleeve 192 in reverse. This likewise will prevent clash of the teeth in shifting the sleeve 192.

Hence, with the arrangement in Figure 9, shift of the sleeve 192 into forward drive position does not immediately energize the eddy current clutch coil 62 such occurring when the engine driven governor N has closed the rheostat switch 359 by causing the control lever to contact the terminal 361. This will occur upon slight depression of the accelerator to speed up the engine and the governor N driven thereby. It should be noted in this connection that at engine idle speeds the rheostat switch is open and thus no creep torque whatever may be transmitted to the tail shaft 12 at this time. Once the switch 359 is closed current will flow to the coil 62 from the battery 144 through conductor 336, 347, switch 349, conductor 357, rheostat 359, conductor 363, switch 364 (the terminals 365, 366 of the latter being bridged), conductor 371, and thence to ground 372 returning to battery by ground 334. Moreover, as the engine speed is increased the rheostat arm 358 will be moved under control of governor N to reduce the resistance in the circuit, thus obtaining gradual increased energization of the coil 62 to effect a smooth start of the vehicle by gradually reducing the slip between the driver 22 and runner 24 of the eddy current clutch D.

Depression of the accelerator pedal 224 will therefore cause the vehicle to be smoothly accelerated in a forward direction with the eddy current clutch operating the planetary gearing F in fastest speed ratio, here direct drive, two elements of the planetary, to wit, the sun gear and annulus being driven in substantially 1:1 ratio, by the runner 24 and crankshaft 20 respectively. In this connection it should be observed as explained above that in starting the vehicle from rest with the clutch coil 62 energized, the planetary is conditioned for operation in 1:1 ratio but the actual ratio is greater than this by reason of slip of the runner 24. This slip is automatically reduced as rapidly as the resistance 360 in the coil circuit is cut out and when the latter occurs the planetary is for all practical purposes established in 1:1 ratio. The output of the planetary comprising the spider 134 drives the input pinion 171 of the countershaft gearing and since the sleeve J is at this time disengaged the drive is indirect or underdrive from the pinion 171 to gear 172, freewheel clutch H, pinion 180, gear 184, clutch teeth 196, clutch sleeve 192, hub 190 to shaft 12. This is overall second speed ratio freewheel drive, i. e., breakaway speed ratio drive (that is, normal starting speed ratio drive) of the transmission and provides substantially a 2.5:1 ratio. With a 3 to 1 axle ratio this provides an overall 7.5:1 ratio.

When the vehicle has been accelerated to a vehicle speed of approximately 15 miles per hour the governor M switch 340 will open thus deenergizing the solenoid L and operating the valve mechanism to admit vacuum to the motor K to cause the diaphragm 268 to compress the spring 270 and shift the rod 256 to the right in Figure 9 to the position shown in phantom whereupon the latch 272 which was released by deenergization of solenoid L will seat in the groove 276 to prevent return of the rod should the vacuum for some reason or other thereafter especially at wide open throttle be reduced below the effective strength of spring 270. Simultaneously the spring 230 will act to move the abutment 254 forward to take up the gap created between it and the left end of rod 256 and will also actuate the sleeve J yoke to shift the sleeve J to drive block position with the ends of the teeth of the sleeve J abutting the teeth of blocker 220.

Upon subsequent release of the accelerator pedal 224 to allow the engine to coast sufficiently to drop the speed of clutch teeth 220 to approximate synchronism with the sleeve J the latter will pass through the blocker 220 and become engaged with the clutch teeth 222 to step up the drive in the transmission to overall fourth speed or high speed drive which is a direct two-way drive. In this drive the planetary continues to function in its high range i. e., 1:1 ratio under drive by the engine and eddy current clutch and the drive in the countershaft unit is direct through shaft 136, clutch teeth 222, sleeve J, gear 184, clutch teeth 196, sleeve 192, hub 190, driven shaft 12. This drive provides an overall 3:1 drive ratio for cruising.

It will be observed that although the switch O is operated during the above upshift operation no ignition interruption will occur since the ignition interruption circuit is also controlled by the governor M switch 340 which is then open.

When driving in fourth speed and rapid acceleration is desired as, for example, when passing cars at speeds above the operating speed of governor M or when climbing hills, two-way third speed or high intermediate drive providing an overall ratio of 4.2 and a transmission ratio of 1.4 may be obtained by kickdown operation of the accelerator pedal 224. Depression of the pedal 224 to or beyond wide open throttle position (whichever has been provided for) actuates the link 376 and lever 380 and causes the finger 388 of the latter to engage the operating lever 370 of the snap switch 364, actuation of which opens the circuit between conductors 371 and 363 to deenergize the eddy current clutch coil 62. Substantially simultaneously the circuit is closed between the conductors 373 and 363 to energize the eddy current brake coil 78. This operation will produce the flux effect previously described on the teeth 107 of the drum 90 of the eddy current driven member 24 and will slow down the rotation of this member whether forward or reverse and cause it to stop whereupon the direct magnetic pull of the flux will hold it stationary. Since the sun gear 110 is positively connected to the eddy current member 24 it also will be held stationary and the planetary gearset F will, through reaction on the sun gear 110 transmit a torque multiplying drive to shaft 136 whereupon the vehicle will be accelerated in underdrive at a speed dependent upon the speed of the engine A, the countershaft gearing G being then in direct drive. It will be understood that torque will be imposed on the shaft 136 from the instant the eddy current member 24 begins to slow down.

Acceleration of the vehicle in third speed (high intermediate) may be continued as long as desired, the operator having a substantial range of control over the throttle without operating the switch 364 and when sufficient vehicle speed has been attained the coil 78 may be deenergized by releasing movement of the accelerator pedal sufficient to operate the switch 364 to open the coil 78 circuit and re-establish coil 62 circuit whereupon the driven member 24 will again be magnetically coupled with the driving member 22 for forward rotation therewith in fourth speed.

It will be understood that a similar kickdown operation to attain greater acceleration may be employed when the vehicle is being driven in overall second speed ratio drive described above at which time the planetary is operated by the eddy current clutch in direct drive ratio and the countershaft gearing is established in low speed, i. e. indirect drive. Under such circumstances the planetary gearing F will as above described be downshifted to its low speed or underdrive ratio (the sun gear being held) and since the countershaft gearing G is then also being driven through its low speed (indirect drive) train (the sleeve J being disengaged) overall first speed or conventional low speed ratio drive will be obtained from this combination of underdrive in the planetary and underdrive in the countershaft mechanism. This provides a 3.5:1 transmission ratio and overall 10.5:1 ratio.

When the vehicle is permitted to slow down as when coming to a stop while operating in third or fourth speed ratio drive, the governor M switch 340 will close when the vehicle reaches a speed somewhat below 15 miles per hour, for instance, about 10 miles per hour, thus energizing the solenoid L and causing the core member 282 to move upwardly and open the valve 284 to vent the motor K. This will allow the spring 270 to actuate the rod 256 against the abutment 254, the latter operating the lever 250 and yoke 234 to disengage the clutch sleeve J. To facilitate disengagement the rod 256 in taking up the gap 278 between it and the abutment 254 (see Figure 9) has its recess 328 actuate the ball 316 of the switch O closing the switch and thus connecting the ignition to ground 346 through the governor switch 340A which is then closed to thereby interrupt the ignition and release the driving torque on the teeth of the clutch sleeve. The ground is removed from the ignition circuit and normal operation again restored when the portion 326 of the rod 256 is moved below the ball 316 allowing it to drop and permitting the spring 324 to open the switch O.

If the vehicle was being operated in overall fourth speed, it now will function in overall second speed. On the other hand, if it was operating in (kickdown) overall third speed the car will be accelerated in overall first speed. When the car is brought to a standstill and the accelerator is released sufficiently to obtain engine idling condition, the governor N will open the circuit between conductors 357 and 363 by disengaging the operating lever 358 from the contact 361. This will deenergize the eddy current coil circuit until then energized and prevent transmission of torque. This feature makes it possible to bring the car to a stop at a traffic light and with the transmission in gear and without obtaining creep. When the light changes, the operator simply depresses the accelerator to speed up the engine to the speed at which it will cause the governor N to close the coil circuit previously opened and permit transmission of driving torque.

It will be understod that reverse drive will be obtained by shifting the sleeve 192 rearwardly in Figure 5 to engage with the clutch teeth 198. Upon depression of the accelerator drive will be initiated in reverse through the eddy current clutch B and drive shaft 20 these operating the planetary F in 1:1 or high ratio and the spider of the planetary impressing drive torque on the shaft 136 which then drives the shaft 12 through the elements 171, 172, freewheeling clutch H182, 188, 186, 198, sleeve 192, hub 190. This will provide a 3:1 ratio in the transmission and an overall ratio of 9:1.

Manifestly, faster speed ratio drives in reverse are also available. Thus the sleeve J will be brought into engagement with the clutch teeth 222 as above described under control of the governor M which being driven from the countershaft will operate at a proportionately lower vehicle speed than when effecting a step-up in forward drive. Greater acceleration in reverse is also available by kickdown operation of the accelerator pedal to deenergize the eddy current clutch and energize the eddy current brake and obtain a step-down in the planetary gearing F to low speed ratio, in this case from direct drive to underdrive. This may be accomplished at the will of the driver whether or not the reverse drive be one in which the sleeve J is engaged or disengaged.

Figure 10 illustrates a modification of the construction of Figure 5 wherein the magnetic path of the eddy current clutch structure is made shorter by magnetically connecting the field core with both toothed elements of the drive member of the clutch. This arrangement also permits a substantial saving in iron.

Thus in Figure 10 the field structure is an annular channel-shaped field core member 60A of magnetic iron or other magnetic material, stationarily secured to the casing 52A, which here is of non-magnetic material, and carries the stationary field coil 62A. Rotatable relative to the field core is the drive member 22A, the inner toothed element 26A of which has its hub portion 32A arranged concentric to the flange 400 of the field core, and the outer toothed element 36A of which is arranged concentric to the flange 402 of the field core and in radial alignment with the flange 400 and hub 32A. Operating clearance is provided by air gaps of about .005 of an inch between the toothed elements of the drive member 22A and the flange portions of the field core. An annular spider 42A connects the elements 26A and 36A. The starter ring gear 50 is here carried by the toothed element 36A.

The eddy current brake structure is similar to that in Figure 5 except that the casing portion 53A has an upward flange 404 bolted to a casing portion 52A of non-magnetic material. The operation of this modification is similar to that described with respect to the Figure 5 structure.

Figure 11 shows a modification of the Figure 9 control circuits, it differing from the Figure 9 arrangement in that the ignition interrupting circuit operated under control of the switch O to unload the teeth of the clutch sleeve J and permit disengagement of this sleeve is replaced with a new circuit acting on the eddy current mechanism to effect a similar result. Since the major portion of the Figure 11 arrangement is the same as that in Figure 9, only the altered portion has been shown completely, the remainder being obvious from Figure 9 as will be evident from the numerals of conductors duplicated in Figure 11.

Thus the conductor 336 extends from the ignition switch 329 to a four pole switch generally referred to by the numeral 340A which is operated by a link arm 306 connected to the vehicle speed responsive governor M. The arm 306 carries two switch closing conductor bars 406 and 408 respectively, which serve to bridge the terminals 410, 412 and 414, 416 respectively when the switch is closed. The conductor 336 aforesaid connects with the terminal 410 and the terminal 412 is connected by a conductor 418 with one end of the solenoid L coil, the other end of the coil being grounded as at 420. As shown the coil L is energized and the sleeve J is in downshifted position.

The energizing circuit for the eddy current clutch coil 62 in the Figure 11 arrangement extends through the interrupter switch O' which as seen is a double pole double throw switch. This switch has a pair of terminals 422 and 424 bridged by a conductor 426 and electrically connecting such terminals whenever the motor K has completed its upshift or downshift operation on the sleeve J through movement of the rod 256. The switch O' has a further pair of terminals 428, 430 which are bridged by the conductor 426 whenever the ball 316 is actuated by the rod 256 in movement of the latter to engage the ball 316 in either the portion 326 or recess 328 from the other.

Thus the energizing circuit for coil 62 comprises the circuit from battery 144 to ignition switch 329, conductor 336, conductor 347, switch 349 and 359 (see Figure 9), conductor 363, terminal 366, conductor 369, terminal 365, conductor 432, terminal 424, conductor 426, terminal 422, conductor 434, coil 62, ground 372.

In obtaining downshift of the clutch sleeve J under control of governor M by closing of switch 340A the rod 256 moves from a position where the ball is engaged in recess 328 to that shown in Figure 11 where it engages portion 326. In the travel between these positions the ball 316 actuates the conductor 426 to break the circuit across terminals 422, 424 and bridge the terminals 428, 430 thus momentarily breaking the circuit described above de-energizing this coil and energizing the eddy current brake coil 78. When this occurs current will flow from battery 144 to switch 329, to switches 349 and 359 (see Figure 9) conductor 363, conductor 436 to terminal 416 of switch 340A, conductor 408, terminal 414, conductor 438, terminal 430, conductor bar 426, terminal 428, conductor 440, terminal 368, conductor 373 to coil 78 and ground 374. Of course, as soon as the ball 316 is established in one of the positions 326 or 328 the coil 62 circuit will be reestablished. The effect of this momentary de-energizing of coil 62 and energizing coil 78 is to momentarily remove the driving load on the teeth of the clutch sleeve J the sleeve tending to overrun the clutch teeth 222 to permit this result. It will be noted that although the switch O' is also operated in making upshifts by clutch sleeve J no change of power flow will occur since the governor switch M is then open and the eddy current clutch coil 62 remains energized by reason of the closing of a switch 440 by governor M when it opens the switch 340A. The switch 440 has terminals 442, 444 which are bridged to electrically connect them in circuit by the conductor bar 446. Thus in making upshifts the coil 62 remains energized during operation of switch O' through a circuit extending from terminal 365 of kickdown switch 364, to conductor 432 to conductor 446 to terminal 444, conductor bar 446, terminal 442, conductor 448, conductor 434 to coil 62.

Figure 12 shows a modification of the kickdown control portion of the Figures 9 and 11 control circuits. It provides a double pole double throw switch 450 operated under control of a speed responsive centrifugal governor P driven by the countershaft gear 304 for limiting kickdown operation of the eddy current mechanism to at or below a predetermined vehicle speed for instance, 40 M. P. H.

The switch 450 has terminals 452 and 454 bridged by a conductor bar 456 when the vehicle is below 40 M. P. H. speed. The terminal 452 connects with the eddy current brake coil 78 through the conductor 373 and the terminal 454 with terminal 368 of the kickdown switch 364 through the conductor 457. So long as the terminals 454 and 456 are bridged, operation of the kickdown switch 364 by the accelerator pedal 224 will connect the terminal 368 to battery through the conductor 363 as in the Figure 9 arrangement. However, above 40 M. P. H. vehicle speed the conductor bar 456 will bridge the terminals 458 and 460, the former being connected to the kickdown switch terminal 368 by the conductor 457 and the latter connecting with the terminal 365 of the kickdown switch to which the coil 62 is connected by the conductor 371. Thus if the kickdown switch be operated above 40 M. P. H. vehicle speed the eddy current brake coil 78 will not be energized because the terminals 454 and 456 of switch 450 are no longer bridged. Instead the eddy current clutch coil remains energized through the circuit established by bridging of the terminals 458 and 460.

This control circuit has a further function and advantage. If a downshift is obtained by kickdown operation below 40 M. P. H. and the accelerator is not thereafter released sufficiently to reset the kickdown switch so as to restore drive through the eddy current clutch, but the vehicle attains a speed above 40 M. P. H. so as to cause the governor switch 450 to operate, a power upshift will take place automatically independently of accelerator pedal position since the planetary F is upshifted from underdrive to direct by the change back to the eddy current clutch drive from the eddy current brake drive.

Moreover, if a downshift is obtained by kickdown operation of the Figure 9 circuit or below 40 M. P. H. by the Figure 12 circuit while the vehicle is operating in fourth speed so as to establish third speed forward and the vehicle is maintained in third speed by exercise of the hereinabove mentioned control provided by the throttle a second downshift will automatically occur as soon as the governor M switch closes at about 10 M. P. H. vehicle speed to establish first speed. Release of the accelerator to operate the kickdown switch will automatically reestablish second speed instead of third speed.

Although the particular structures herein described are well adapted for carrying out the objects of the invention it will be understood that various modifications, changes, and substitutions may be made without departing from the spirit thereof. For example, where flux leakage becomes too great a problem in an arrangement employing an eddy current clutch and brake the brake may, as illustrated in Figure 13, be replaced for instance, by a multiple disc magnetic clutch E' serving as a brake for holding the sun gear 110 from rotation and which includes an annular core 76' stationarily secured as by bolts 77' to the casing element 53' and a field coil assembly 78' adapted to be energized and deenergized in the manner described with respect to the eddy current brake coil 78. A non-magnetic sleeve 500 is fixed to the core 76' and has internal splines 502 which slidably fit in slots 504 of the movable friction discs 506 and which interengage with a movable magnetizable armature 508. Other friction discs 510 alternate axially with the discs 506 and are slidably splined as at 511 on a projecting annular portion 512 of the driven member 24' structure, of which the sun gear 110 forms a part. A snap ring 514 holds the armature 508 endwise on the sleeve 500. In operation of the device as when the coil 78' is energized in the manner described above with respect to the coil 78, the armature 508 is drawn toward the pole faces of the core 76' and effects pressure contact between the juxtaposed friction discs thereby clutching the driven member to the core 76' and serving to hold the driven member 24' from rotation.

It will be further understood that the various features disclosed and described may be combined in ways other than those shown without departing from the present invention. For example, the governors M and P could be combined. The present invention is therefore, to be construed to include all such modifications, changes and substitutions as may come within the scope of the following claims.

I claim:

1. A variable speed transmission comprising in combination an input shaft; a coaxial output shaft; a drive pinion on said input shaft and including a toothed clutch member; an underdrive gear and a reverse gear each journalled on said driven shaft, said underdrive gear including a toothed clutch member and a shiftable clutch sleeve, the latter adapted to be engaged with said drive pinion clutch member; said reverse gear also including a tooth clutch member; a clutch sleeve drivingly connected to said output shaft and adapted to be engaged with said underdrive gear clutch member or with said reverse gear clutch member; countershaft gearing including a drive gear in constant mesh with said drive pinion, an underdrive pinion in constant mesh with said underdrive gear and a reverse pinion; a one-way free wheel clutch between said drive gear and underdrive pinion; an idler gear in constant mesh with said reverse pinion and reverse gear and blocker means between each of said clutch sleeves and their respective engageable toothed clutch members.

2. A transmission as claimed in claim 1 wherein the underdrive and reverse blocker clutch member are oversize with respect to the drive blocker clutch member.

3. A transmission comprising input and output shafts; a plurality of change speed means connectible between said shafts to provide a plurality of forward speed ratio drives; electromagnetically controlled means for controlling establishment of one of said drives; engageable toothed drive control means engageable for stepping up said one drive; governor means for controlling engagement of said toothed means; means for effecting disengagement of said toothed means; means operable upon said electromagnetically controlled means by said last mentioned means for interrupting the power flow to said toothed means for facilitating disengagement thereof; and means operable by said governor means for preventing interruption of said power flow when effecting engagement of said toothed means.

4. A transmission for a motor vehicle comprising input and output shafts, planetary change speed means connectible between said shafts operable to provide a relatively fast speed and a relatively slow speed drive between said shafts, eddy current clutch means for controlling establishment of the relatively fast speed drive of said planetary change speed means in starting the vehicle from rest, a field coil for energizing said eddy current means, electrical resistance means for controlling energization of said coil for said fast speed means, governor means for controlling the effect of said resistance upon said field coil and manual control means for controlling energization of said coil for initiating drive through said transmission.

5. A transmission as claimed in claim 4 wherein said governor means is responsive to engine speed and includes means for deenergizing said field coil at engine idle speed.

References Cited in the file of this patent

UNITED STATES PATENTS

| | | |
|---|---|---|
| 1,794,613 | Heany | Mar. 3, 1931 |
| 1,970,716 | Thompson | Aug. 21, 1934 |
| 2,284,233 | Schotz | May 26, 1942 |
| 2,333,863 | Hull | Nov. 9, 1943 |
| 2,343,291 | Gilfillan et al. | Mar. 7, 1944 |
| 2,411,122 | Winther | Nov. 12, 1946 |
| 2,579,693 | Orr | Dec. 25, 1951 |